United States Patent [19]

Barker

[11] Patent Number: 5,340,168
[45] Date of Patent: Aug. 23, 1994

[54] PILOTED SWIVEL SEAL FITTING

[76] Inventor: David A. Barker, 5630 Imperial Hwy., South Gate, Calif. 90280

[21] Appl. No.: 89,072

[22] Filed: Jul. 2, 1993

Related U.S. Application Data

[63] Continuation of Ser. No. 725,055, Jul. 5, 1991, abandoned.

[51] Int. Cl.⁵ ............................................. F16L 39/02
[52] U.S. Cl. ........................................ 285/276; 285/351; 285/168
[58] Field of Search ............... 285/149, 351, 272, 275, 285/276, 277, 281, 168, 179

[56] References Cited

U.S. PATENT DOCUMENTS

| | | |
|---|---|---|
| 2,525,652 | 10/1950 | Cunningham . |
| 3,278,204 | 10/1966 | Currie ........................... 285/281 |
| 3,558,163 | 1/1971 | Moore ........................... 285/276 |
| 3,752,506 | 8/1973 | Fouts ............................. 285/149 |
| 3,900,221 | 8/1975 | Fouts ............................. 285/276 |
| 4,113,288 | 9/1978 | Cox ............................... 285/276 |
| 4,135,744 | 1/1979 | Fouts ............................. 285/253 |
| 4,478,435 | 10/1984 | Cheshier et al. .................. 285/351 |
| 4,478,438 | 10/1984 | Elorriaga, Jr. .................... 285/276 |
| 4,615,547 | 10/1986 | Sutcliffe ........................... 285/351 |
| 4,707,000 | 11/1987 | Torgardh ......................... 285/351 |
| 4,804,206 | 2/1989 | Wood et al. ...................... 285/276 |
| 4,817,996 | 4/1989 | Fouts ............................. 285/276 |
| 4,863,202 | 9/1989 | Oldford .......................... 285/351 |
| 4,998,755 | 3/1991 | Reeder ........................... 285/281 |

FOREIGN PATENT DOCUMENTS

| | | |
|---|---|---|
| 0152723 | 8/1985 | European Pat. Off. . |
| 492780 | 7/1992 | European Pat. Off. ......... 285/281 |
| 417249 | 1/1967 | Switzerland ..................... 285/276 |
| 870938 | 6/1961 | United Kingdom ............... 285/276 |

*Primary Examiner*—Eric K. Nicholson
*Attorney, Agent, or Firm*—Fulwider Patton Lee & Utecht

[57] ABSTRACT

A hose end fitting for fluid conduits and the like allows for rotation of the fitting relative to a mating port. The fitting includes an increased bearing surface in combination with a seal and locking means to reduce any tendency of the fitting to pivot due to bending forces on the base, thus eliminating leakage due to deformation of the seal.

10 Claims, 7 Drawing Sheets

PILOTED SWIVEL SEAL FITTING

This application is a continuation of application Ser. No. 07/725,055, filed Jul. 5, 1991 now abandoned.

FIELD OF INVENTION

The present invention relates generally to fluid conduit connectors and, more particularly, to a new and improved apparatus for a rotary hose and fitting.

DESCRIPTION OF THE PRIOR ART

Hose end and fitting assemblies are well known in the art and there are a number of examples of sealed, detachable, reusable fitting assemblies of the type of the present invention. While many of such prior art devices disclose effective hose fitting assemblies which provide a good sealing relationship between the hose end and the fitting, most of these devices are adapted for connecting two fluid connecting members which are in general rotational alignment. In other words, the sealing relationship established when the fittings are assembled to the hose may be destroyed if the nipple is rotated relative to the hose after the assembly.

There have been a number of attempts to allow for the rotation of the fitting relative to the connected fluid conduit. An example of one such fitting is disclosed in U.S. Pat. No. 3,752,506 (hereinafter referred to as "the '506 patent") issued to Robert E. Fouts on Aug. 14, 1973 and U.S. Pat. No. 3,900,221 issued to Robert E. Fouts on Jan. 28, 1974. Generally speaking, both of these patents describe a swivel fitting with a male member inserted within a female member. An elastomeric O-ring is fitted within a groove defined within the respective members. The O-ring is compressed between the members to provide a fluid seal therebetween. A wire connector is placed within another groove defined within the respective members. By this construction, the male member is allowed to rotate axially relative the female member while still providing a coupling between the hose and the fitting.

However, there are limitations to the use of such devices. For example, there is a general tendency in these prior art devices to encounter slight pivoting or angular misalignment between the male and female members, thus impairing swiveling and permiting leaking across the seal. This pivoting may be described as, as a slight deviation from the coaxial orientation of the male member relative the female member. In devices such as those disclosed in the '506 patent, the O-ring may compensate for some of this pivoting. However, as the fit between the O-ring and the respective member is tightened to better compensate for the pivoting and leakage, swiveling of the respective members relative each other will be hampered.

Furthermore, it should be noted that in certain prior art devices the tendency of pivoting between the male and female members may contribute to improper installation of the hose end to a fitting of the type described in the '506 patent. Lip seal and cutter type end hoses, as described in military specifications Mil-F-83798A and Mil-H-83796, are some examples. In these cases, an improper alignment or pivoting allowed between the nipple and the cutting edge of the spur or cutter can result in an uneven wall section being cut into the inner liner of the hose as the end fitting is installed to the hose. Consequently, an uneven pressure may be applied by the socket and the integrity of the primary seal and the hose to fitting retention may be jeopardized.

Hence, those concerned with the development and use of hose connectors have long recognized the need for an improved apparatus which allows for rotational indexing of a fitting relative a fluid conduit while maintaining an improved fluid seal. The present invention fulfills all of these needs.

SUMMARY OF THE INVENTION

Briefly and in general terms, the present invention provides a new and improved apparatus which compensates for fluid conduit rotational indexing without compromising the fluid seal.

In one preferred embodiment of the present invention, a hose coupling member is provided for cooperating with a female member to engage a fluid conduit, e.g., a hose, a tube or pipe. The female member has an interior multi-stepped surface defining a receiving bore therethrough. A male nipple member for slidable receipt within the receiving bore includes an annular connector and a generally cylindrical side wall portion. The side wall includes a multi-stepped exterior surface which includes at least one annular shoulder. The exterior surface of the male member extends radially outward to slidably abut with corresponding interior surface portions of the female member receiving bore. By this construction, the tendency of the male member to pivot relative the female member is substantially reduced.

A first annular or locking wire groove and a second annular or sealing groove are defined, in part, within corresponding portions of the exterior surface of the male member and interior surface of the female member. By this construction, when the female member is correctly positioned axially relative to and receives the male nipple member within the receiving bore, portions of the respective members together define the locking wire groove and the sealing groove for receipt of a locking wire and an elastomeric O-ring respectively. The locking wire inhibits angular displacement of the female member relative the male member while the elastomeric 0-ring maintains a fluid seal thereacross, allowing the members to rotate axially relative each other.

From the above description, it can be readily seen that the present invention presents a new and improved apparatus for end fitting a fluid conduit which allows for rotational indexing of the fitting while maintaining an improved fluid seal thereacross. These and other objects and advantages of the invention will become apparent from the following detailed description, taken in conjunction with the accompanying drawings, which illustrate, by way of example, the principles of the invention.

DETAILED DESCRIPTION OF THE INVENTION

As shown in the exemplary drawings, an improved piloted swivel fitting constructed in accordance with the present invention is provided for allowing fluid conduit rotational indexing while maintaining an improved fluid seal thereacross.

Figure 1:
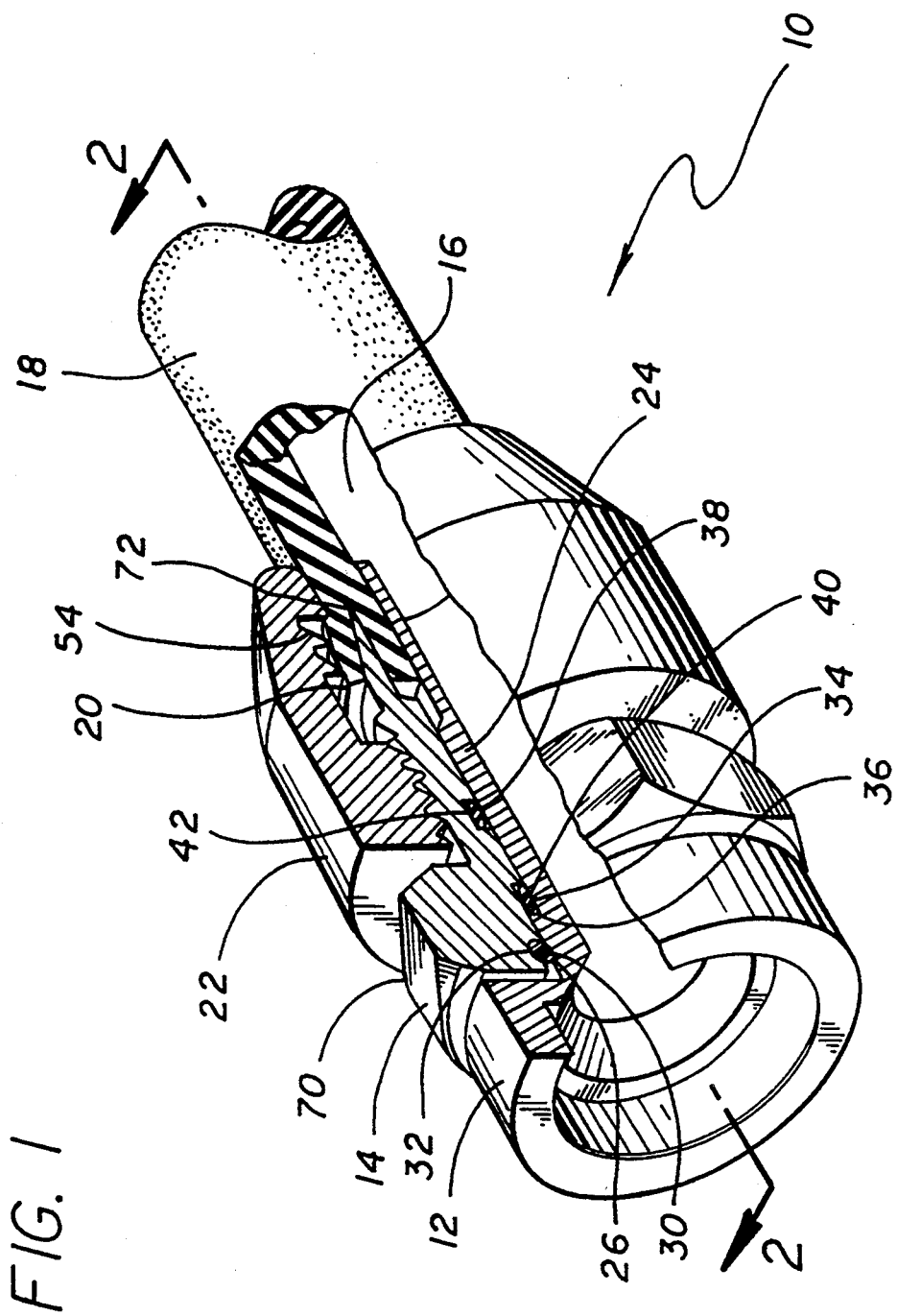
FIG. 1 is a generally perspective fragmentary sectional view of the swivel fitting embodying the novel features of the present invention in combination with a fluid conduit.

Referring to FIG. 1, the improved swivel fitting 10 of the present invention includes a male member 12 connected to a first hose or other fitting (not shown), and inserted into a female member or cutter 14. Female member 14 has a receiving bore or passageway 16 defined therethrough. Fluid conduit or second hose 18 has a hose end 20 connected to the female member 14 by a hose coupling 22. Briefly, a nipple or generally cylindrical shaft portion 24 extends from the male member 12 to snugly but slidably fit within the receiving passageway 16 defined within the female member 14 and thus connect to the second hose 18. Locking means 26 is provided to cooperate with and maintain the desired relative axial orientation of the male member 12 and female member 14. Locking means 26 may include a locking wire 30, inserted within a locking cavity 32, defined, in part, within the male member 12 and female member 14. Sealing means 34 is provided to maintain the fluid seal between the male member 12 and female member 14. Sealing means 34 may include a first and second sealing cavities 36 and 38, respectively, which are defined in part within the male member 12 and female member 14, and sized to receive first and second elastomeric O-rings 40 and 42, respectively, therein.

Figure 2:
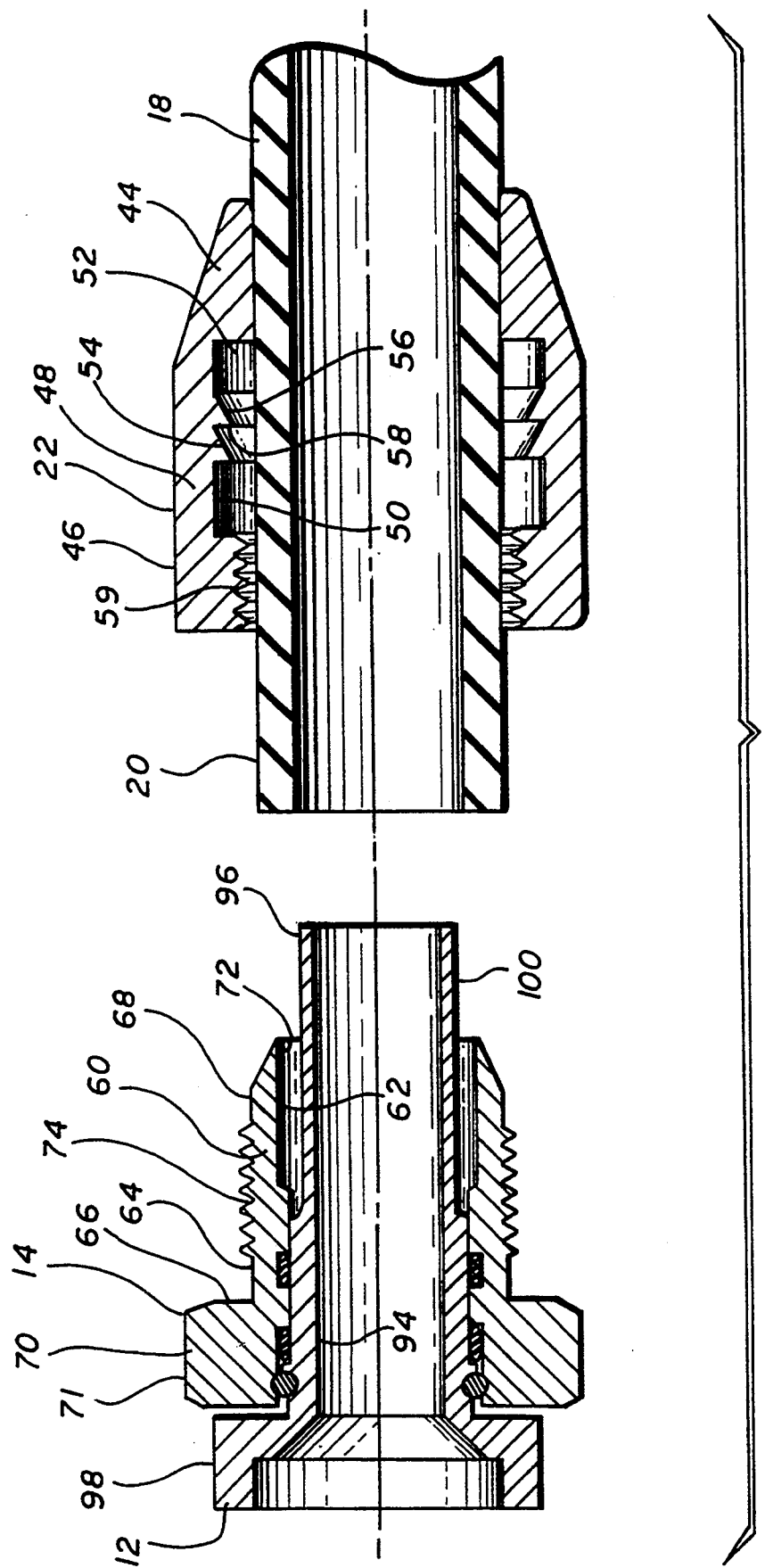
FIG. 2 is a an exploded sectional side elevational view of the fitting of FIG. 1.

Referring to FIG. 2, the hose coupling 22 is provided to cooperate with the female member 14 to engage with the hose end 20. The hose coupling 22 has a first coupling end 44, a second coupling end 46, and a coupling side wall 48. Coupling side wall 48 has an interior coupling surface 50 which defines a longitudinal coupling passageway 52, sized to receive the second hose 18, extending therethrough. A plurality of annular ridges 54 formed within interior coupling surface 50 extend radially inward into the longitudinal coupling passageway 52, generally towards the first coupling end 44, for engagement with the second hose 18. Each annular ridge may include a leading surface 56 formed within the interior coupling surface 50, sloping radially inward to terminate in a back wall 58, which may, for example, be generally orthogonal to the central longitudinal axis of the hose 18 or coupling passageway 52. In one preferred embodiment, the slope extends radially inward at about twenty-five to about forty-five degrees from the plane generally parallel to the longitudinal axis of the coupling passageway 52 of the interior coupling surface 50, preferably about thirty degrees from the plane. Threads 59 are formed in the interior coupling surface 50 adjacent the second coupling end 46 for threaded engagement with the female member 14.

Still referring to FIG. 2, the female member 14 cooperates within the hose coupling 22 to engage the hose end 20 of the second hose 18. The female member 14 includes a female side wall 60 having a female interior surface 62, female exterior surface 64, a first female end 66 and a second female end 68. A generally orthogonal hex body 70 is formed at first female end 66 to extend radially outward therefrom. The exterior surface 71 of the hex body 70 may be hexagonal to facilitate use with conventional tools, e.g., socket or crescent wrenches. Female side wall 60 extends in a first direction away from the hex body 70 to terminate in an angled female cutting or leading edge 72 at second female end 68. In the exemplary embodiment, the side wall 60 is in the form of a generally cylindrical member. Female engaging means 74 is formed on the exterior surface 64 of the female side wall 60 for cooperation or engagement with the hose coupling 22. In the preferred embodiment, the engaging means 74 may be in the form of threads to correspondingly engage with those formed on the inside surface of the hosing coupling 22.

Figure 3:
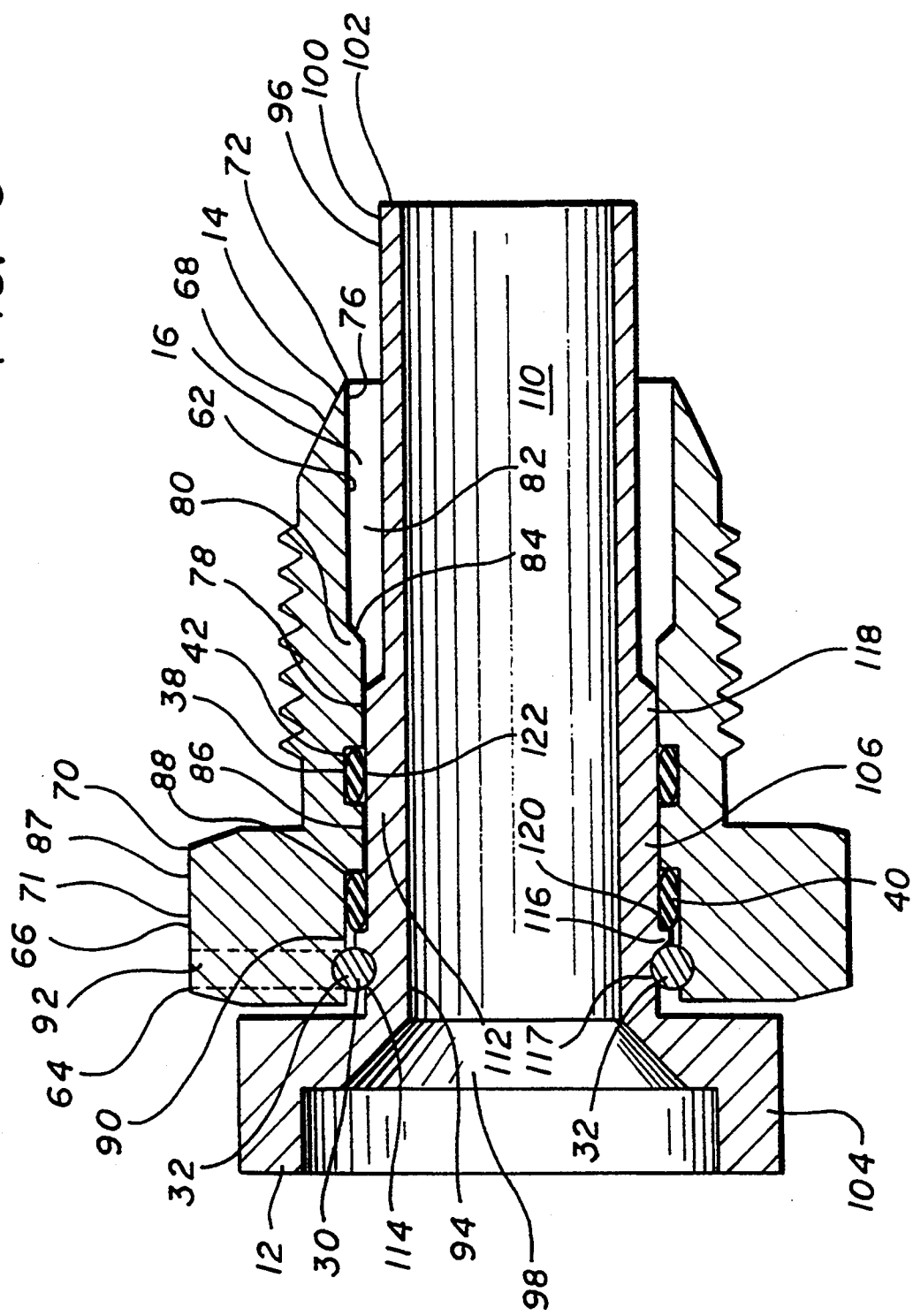
FIG. 3 is a sectional side elevational view of the fitting of FIG. 1.

As best shown in FIG. 3, the female men, her 14 defines a receiving bore or communicating passageway 16 therethrough. The female interior surface 62, in the preferred embodiment, has a multi-stepped topography having a first female annular section or portion 76, a second female annular portion or first neck 78 and a transition portion 80 therebetween. The first annular portion 76 is formed adjacent the female end 68 and extends from the leading edge 72 towards the hex body 70. The first annular portion 76 having a first substantially uniform inner diameter defining, in part, a hose cavity 82 to receive the hose end 20 of the second hose 18 as more fully described elsewhere in this application. In this exemplary embodiment, the first annular portion 76 has an inside diameter between about 0.986 inches to about 0.980 inches. Such an inside diameter is sized for use with a (−16) hose. This and other dimensions described in this application may readily be modified by those skilled in the art to adapt the improved swivel fitting 10 of the present invention to other hose or tubing sizes.

The first annular portion 76 terminates in a connecting transition portion 80 having an interior transition surface 84 extending between the first annular portion 76 and second annular or first female neck portion 78. In this particular embodiment, the interior transition surface 84 slopes radially inward from the generally relatively larger first inside diameter of the first annular portion 76 to a second relatively smaller inner diameter of the second annular portion 78 at a minimum of about 30 degrees from the plane generally parallel to the central longitudinal axis of the female member 14.

The first female neck portion 78 is formed generally midway between the first female end 66 and the second female end 68 to extend generally axially from the transition portion 80 towards the hex body 70. In the preferred embodiment, the first female neck 78 begins at about 0.550 to about 0.580 inches from the female leading edge 72 and extends, relative the female leading edge, from about 0.250 inches to about 0.280 inches, toward the hex body 70. The first neck 78 has a second inner diameter sufficient to slidably abut and engage the corresponding portion of the male member 12 as more fully described elsewhere in this application. For example, in the exemplary embodiment, the second inner diameter may be on the order of about 0.961 inches to about 0.960 inches. In this particular embodiment the second annular portion 78 terminates in the second sealing cavity 38. A second female neck or third annular portion 86 having a third inner diameter of about 0.960/0.961 inches, defines, together with the first neck 78, portions of the second sealing cavity 38 therebetween. The second neck 86 extends axially from the second sealing cavity 38 from about 0.100 to about 0.125 inches. A trailing edge 88 of the second annular neck 86, i.e., the edge relatively proximal to the first female end 66 or distal to the second female end 68, has a notch angled at about 25–35 degrees relative to the central longitudinal axis of the female member to extend a distance of about 0.040/0.050 inches. An annular depression 90 defined within the female interior surface 62, extends axially towards the first end 66 of the female member 14 from the second female annular neck 86. The annular depression 90 has a third inner diameter of about 1.060 inches to about 1.062 inches. Locking groove 32 is defined, in part, within the annular depression 90. Communicating bore 92 extends from the exterior surface 71 of the hex body 70 to the locking groove 32 defined within the female member 14.

Still referring to FIG. 3, there is also shown the male member 12 for snug but slidable, generally coaxial receipt within the female member 14. The male member 12 having a male interior surface 94, a male exterior surface 96, a first male end 98 and a second male end 100, the second end terminating in male leading edge 102, is sized for insertion into the receiving passageway 16 of the female member 14. The male member 12 includes a first annular end ring or connector body 104 generally formed at first male end 98 and the generally cylindrical male side wall or shaft 106 extending outward therefrom towards second male end 100. The male side wall 106 extends outward a sufficient distance to extend beyond the cutting edge 72 of the female member 14 when the male member 12 is received within the female member 14. In the exemplary embodiment, the male sidewall 106 is about 1.900 to about 1.925 inches in length so that the second male end 100 extends axially about 0.580 to about 0.600 inches beyond the cutting edge 72 of the female member 14. The male interior surface 94 defines a male central communicating passageway 110 for passing fluids therethrough.

Male annular locking shoulder 112 extends distally and axially from the first male end 98 towards the second male end 100. In one exemplary embodiment, a first shoulder portion 114, adjacent the connector body 104, extends about 0.275 inches to about 0.230 inches from the connector body. A male annular locking ridge 116 is formed within the first shoulder portion 114 and the male exterior surface 96. The locking ridge 116 is axially spaced apart from the annular ring 104 a sufficient distance, to define, together with the annular ring, first male annular groove 117. The first male annular groove 117 is formed and positioned within the male exterior surface 96 to cooperate with the appropriate portion of the female interior surface 62 to define, together with the female member 14, locking cavity 32. In the preferred embodiment, the locking cavity 32 is generally formed by a half-diameter formed within the male member 12 and a half-diameter formed within the female member 14. The total diameter of the locking cavity must be slightly larger than that of the locking wire 30 to allow the male member 12 to axially rotate relative the female member 14 while maintaining an improved fluid seal therebetween. The locking ridge 116 extends radially outward from the male member 12 a sufficient distance to snugly but slidably abut or engage with the interior surface 62 of the second annular depression 90 of the female member 14. About 1.058 to 1.059 inches.

A second portion 118 of male member annular locking shoulder 112 extends distally and axially from the first male end 98 and first shoulder portion 114 towards the second male end 100. The annular locking shoulder second portion 118 extends radially outward a sufficient distance to snugly but slidably abut and engage with the multi-stepped interior surface 62 of the female member 14. In one exemplary embodiment, the second portion 118 of the male shoulder 112 has an outside diameter of about 0.957 to 0.958 inches and extends longitudinally or axially about 0.450 inches to about 0.500 inches from the first shoulder portion 114 or locking ridge 116 towards the second male end 100. By this construction, the male member 12 pilots and extends into the receiving passageway 16 and the female member 14 a sufficient distance to stabilize or substantially reduce any pivoting tendency by the male member relative the female member by slidably abutting with the female interior surface 62. In this particular embodiment, the outer surface of the locking shoulder second portion 118 may, in part, together with the multi-stepped female interior 62, define first and second sealing cavities 36 and 38, respectively, axially spaced from one another. In this particular embodiment, the first and second sealing cavities 36 and 38 are spaced about 0.100 inches to about 0.125 inches apart from one another.

In the exemplary embodiment, the first sealing cavity 36 is formed by axially spacing and positioning a front wall 120 of the locking ridge 116 relative the trailing wall 88 of the second annular neck 86. The front wall 120 of the locking ridge 116 and portions of the male exterior surface 96 form a surface having a first portion generally parallel to the central longitudinal axial of the male and female members and a second non-parallel surface portion. In the exemplary embodiment, since the front wall 120 is generally orthogonal to the central longitudinal axis of the male member 12, and the exterior surface of the male member is generally parallel thereto, a generally L-shaped surface portion is formed. Likewise, the trailing wall 88 of the second annular neck 86 and portions of the female interior surface 62 immediately adjacent thereto form a corresponding inverted L-shaped surface portion. In this exemplary embodiment, the first sealing cavity 36 is defined by axially positioning these complimentary L-shaped surfaces immediately adjacent one another. While in the exemplary embodiment, the first wall 120 and the trailing wall 88 are both generally orthogonal to the central longitudinal axes of their respective members, and thus parallel to one another. The inventor contemplates that other combinations of surface formations are possible so long as they sufficiently compress the O-ring 40 and provide a sufficient fluid seal. For example, having the front wall 120 of the locking ridge 116 angled between about 60 degrees to about 45 degrees relative to the central longitudinal axis of the male member 12, and the trailing wall 88 angled between about 60 degrees to about 45 degrees relative the central longitudinal axis of the female member 14, will provide such a seal. This structure creates a cavity sized to receive the elastomeric O-ring 40 without having to cut angular grooves in the respective surfaces of the male and female members. This construction shortens the overall length of the improved swivel fitting 10 without adversely increasing the pivoting of the male member 12 relative to the female member 14.

In this particular embodiment, the second annular sealing cavity 38 is defined by an annular groove 122 defined in the female member 14 to define, together with the substantially cylindrical or uniformly diametered male exterior surface 96, the second annular sealing cavity 38. By this construction, more than half the diameter of the O-ring 42 need not protrude from the sealing groove 122 when the members are assembled together. The radius of the O-ring 42 need not be greater than the depth of the annular groove 122.

O-rings 40 and 42 are generally of a circular cross-section and are stretched to fit in their respective sealing cavities. The selection of the proper dimensions of the O-rings 40 and 42, the outside diameter of the male member 12, the inside diameter of the female member 14 and the size or depth of the cavities 36 and 38 are important if the O-ring is to provide an effective seal and yet provide and allow for rotation between the members. If the O-rings 40 and 42 are compressed too much, it will inhibit rotation. If the O-rings 40 and 42 fit too loosely, in the groove, fluid will be able to leak past. The specific dimensions of the cavities and the O-rings will vary depending upon the size of the fitting. It has been found that the O-ring associated with the first seal means should protrude a short distance relative to its diameter. It has been confirmed that a protrusion of the O-ring should be less than half its diameter, and should be preferably less than one-fourth of its diameter. Depending upon the diameter of the members, the exact depth of the groove and the diameter of the O-ring can be determined without undue experimentation by those of ordinary skill in the art. For example, O-rings of the type manufactured by National O-Ring of Southfield, Mich., having an inside diameter of about 0.917 to about 0.935 inches and a wall or cross section thickness of 0.073 to 0.067 referred to as −21 size O-ring may be used in combination with the grooves as described in this application. The form of the groove should be slightly larger than that of the O-rings to allow for any swelling or expansion as is normally acceptable by this method of sealing and should conform as close as possible to those dimensions as given by the O-ring manufacturers and industry standards for the O-ring size selected. The clearances between the mating surfaces and diameters should be kept within tolerances provided for by the industry to guarantee the proper sealing action of the O-rings.

While the two O-rings 40 and 42 compliment each other and both function to maintain alignment of the male member 12 relative to the female member 14, allow for rotation between the members, and provide an effective seal to prevent leakage between the members, the second O-ring 42 provides a back-up sealing system as well as a stabilizing and alignment means if the internal clearances are increased to ease the rotational ability of the improved swivel fitting 10.

Locking means 26 is provided between the male and female members 12 and 14, respectively, to maintain a given axial orientation of the members relative to each other. In the exemplary embodiment, the locking means 26 includes locking wire 30 passed through the female communicating bore 92 to lie within the locking groove 32 defined, in part, within both the male member 12 and the female member 14. The locking wire 30 significantly reduces longitudinal axial movement and maintains an improved fluid seal between the male and female members 12 and 14, yet allows for rotation of the members relative to each other about their respective longitudinal axes.

Figure 4:
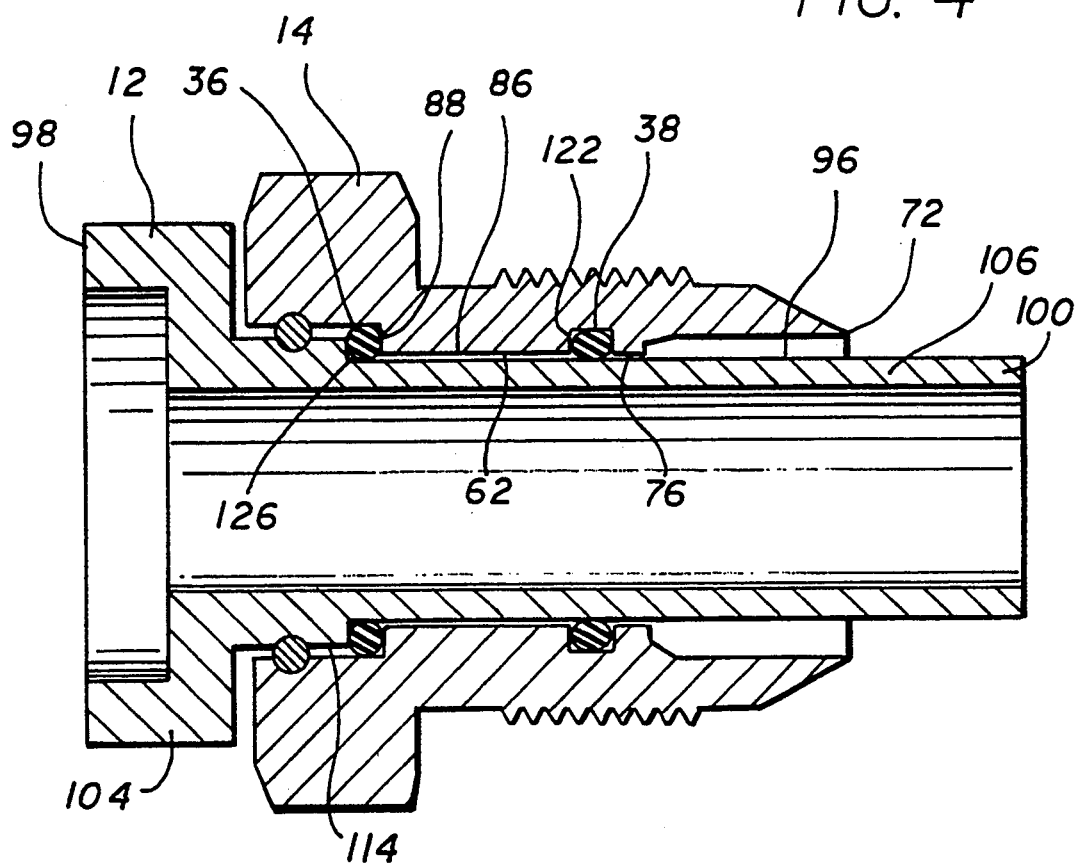
FIG. 4 is a sectional side elevational view of another embodiment of the present invention.

FIG. 4 illustrates an alternative embodiment of the present invention. In this second embodiment, the male cylindrical side wall 106 has a substantially uniform outer diameter or male exterior surface 96 extending from the annular ring or connector body 104 to the second male end 100. In this particular embodiment, the first portion 114 of the male annular locking shoulder extends about 0.225 inches to about 0.230 inches from the annular ring 104 towards the second male end 100.

In this particular embodiment, the first portion of annular shoulder 114 terminates in a leading wall 126. The leading wall 126 has a surface that is generally non-parallel to the central longitudinal axis of the male member 12. In this particular embodiment the leading wall 126 may be generally orthogonal to the central longitudinal axis of the male member 12. Axially spaced apart from the leading wall 126 is the trailing wall 88 of the second neck 86. By this stepped and spaced apart construction, the first sealing cavity 36 is defined without cutting an annular circumferential groove in the surfaces of the male member 12 and the female member 14 as in the first embodiment. To compensate for the absence of the second portion 118 of the male annular locking shoulder 112 normally extending towards the first male end 100, the inner diameter of the female interior surface 62, for example, the neck portions 76 and 86, extend radially inward a further sufficient distance to maintain the distance between the respective surfaces within the desired tolerances. For example, the female neck portions 76 and 86 may have inside diameters of about 0.862 inches to about 0.865 inches to maintain a separation of about 0.001 to about 0.003 inches on diameter.

A portion of the second sealing cavity 38 which is formed within the female interior surface 62, is distally and axially displaced towards the second female member 68 as compared with the positioning of the second sealing cavity as described in the first embodiment. In this particular second embodiment, the annular sealing groove 122 is formed about 0.620 to about 0.640 inches from the cutting edge 72. As a result, the second neck portion 86 is between about 0.285 inches to about 0.300 inches in length, while the first neck portion 76 is about 0.050 inches to about 0.070 inches in length. For the purposes of clarity, the length refers to the axial distance along the axis or plane parallel to the central longitudinal axis of the female member 14.

Figure 5:
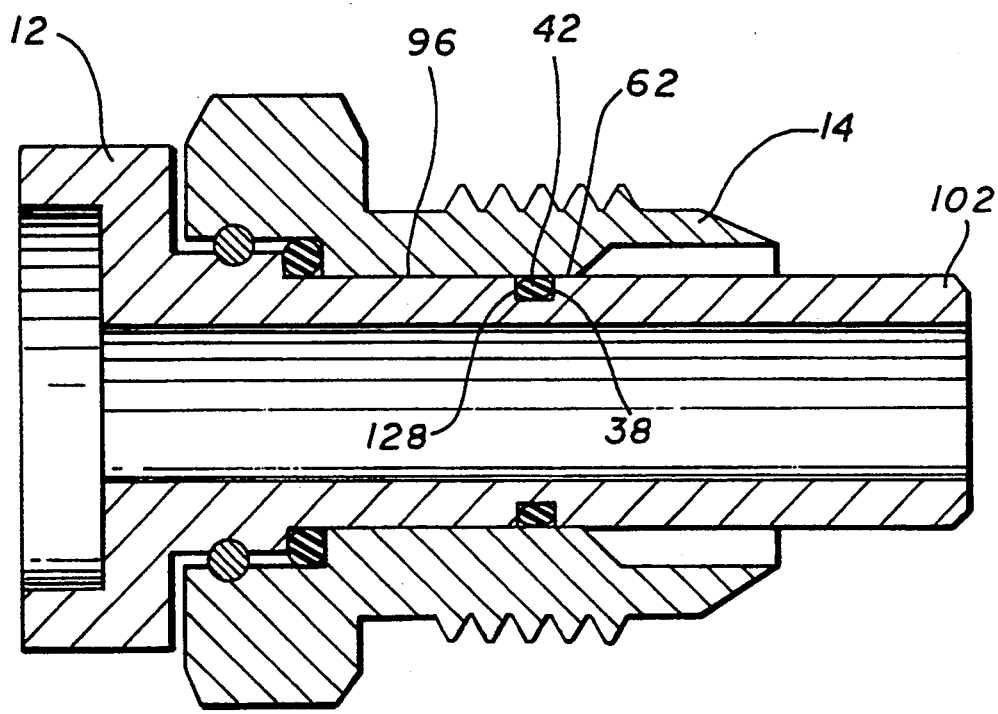
FIG. 5 is a sectional side elevational view of a further embodiment of the present invention.

FIG. 5 (case 2) is a further embodiment of the present invention. In this particular embodiment, the male member 12 and the female member 14 are constructed similarly to that of the second embodiment. In this particular embodiment, however, the second sealing cavity 38 is in the form of a circumferential annular groove 128 defined within the exterior surface 96 of the male member 12. Circumferential annular groove 128 is defined within the male member exterior surface 96 at substantially the same axial location as the annular groove 122 of FIG. 4. For example, in the exemplary embodiment the annular groove 128 is about 1.23 inches to 1.250 inches from male leading edge 102. Annular groove 128 cooperates with a substantially uniformly diameter portion of the inside surface 62 of the female member 14 to form second sealing cavity 38 for compressive receipt of second O-ring 42 therein. The formation of the first sealing cavity 36, i.e., the stepped relationship between non-parallel surfaces of the male and female members is more fully described elsewhere in this application with reference to FIGS. 3 and 4.

Figure 6:
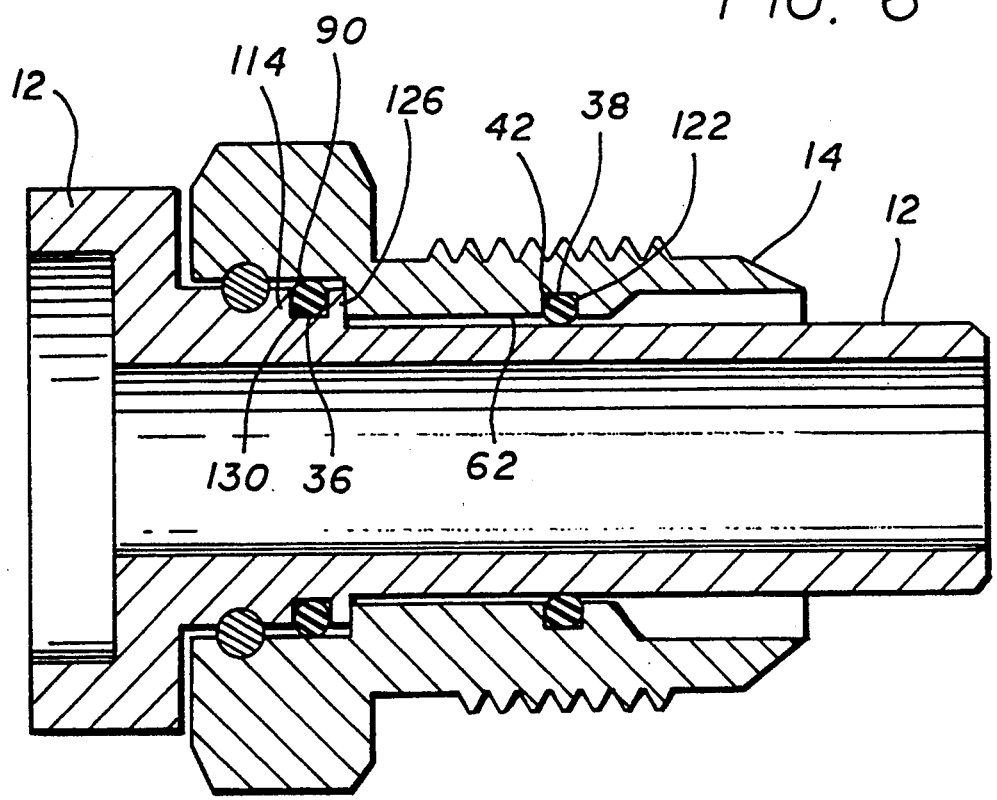
FIG. 6 is a sectional side elevational view of yet another embodiment of the present invention.

FIG. 6 (case 3) illustrates yet another embodiment of the present invention. In this particular embodiment, the second sealing cavity 38, for receipt of the second O-ring 42, is formed as earlier described in reference to FIG. 4, the first alternative embodiment, i.e., annular groove 122, is defined within the interior surface 62 of the female member 14. In addition, the first sealing cavity 36 is defined, in part, by the female interior surface 62 of the female member 14, more specifically annular depression 90, and by circumferential groove 130 defined within the exterior surface 96 of the male member 12, in contrast to some of the other embodiments disclosed in this application with incorporate a stepped-axially spaced relationship between off-set generally orthogonal walls. The first sealing cavity 36 in this embodiment, may be formed about 0.030 inches to about 0.060 inches from the male leading wall 126 of a first portion of the male shoulder 114.

Figure 7:
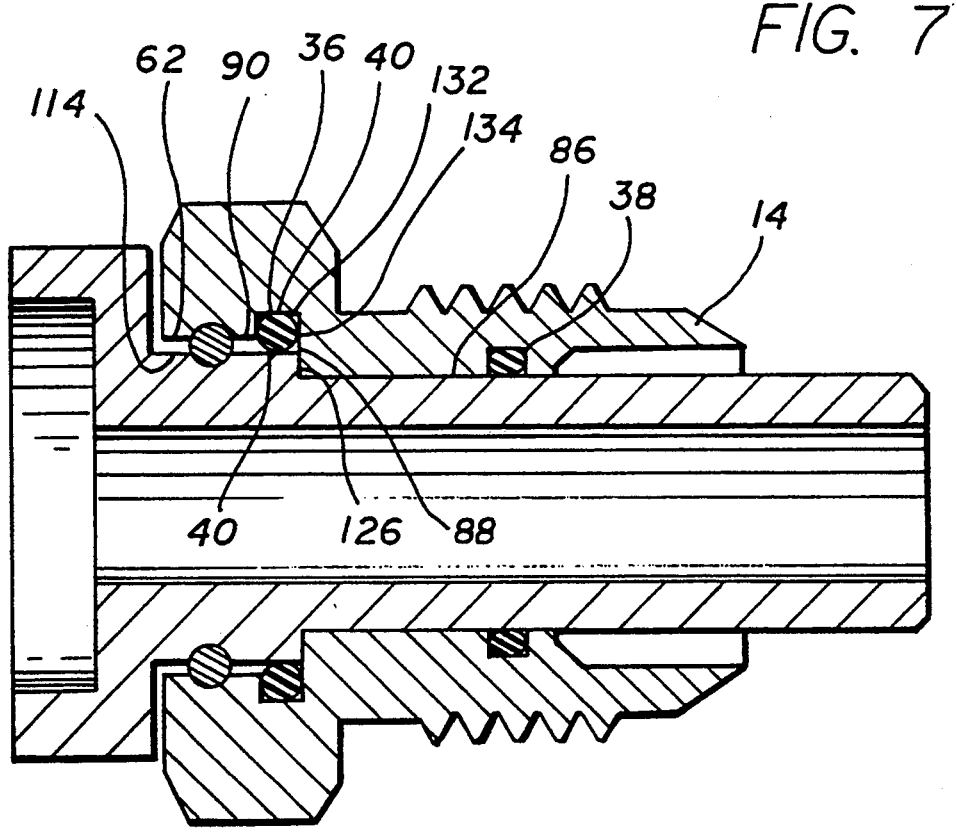
FIG. 7 is a sectional side elevational view of a still further embodiment of the present invention.

Referring now to FIG. 7 (case 4), there is shown a still further embodiment of the present invention. In this embodiment, the second sealing cavity 38 is formed as earlier described in reference to FIG. 4, the first alternative embodiment. In this particular embodiment, however, the first sealing cavity 36, for receipt of O-ring 40, therein, is formed in part by a circumferential sealing groove 132 within the interior surface 62 of the second annular depression 90 of the female member 14. In this particular embodiment, the first shoulder portion 114 terminates in a leading wall 126. A leading wall 134 of the first sealing groove 132 is generally parallel with the leading edge of the leading wall 126 of the first shoulder portion 114 or, alternatively, with the trailing edge 88 of the third annular portion or second neck 86 of the female member 14.

Figure 8:
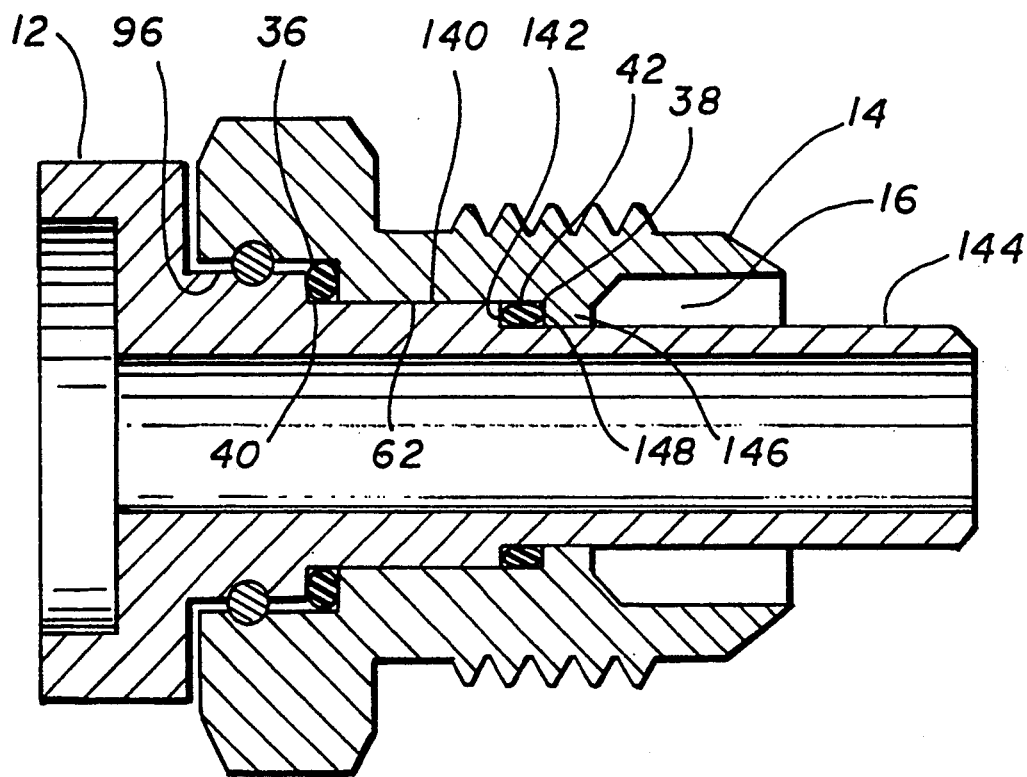
FIG. 8 is a sectional side elevational view of yet another embodiment of the present invention.

Referring now to FIG. 8 (case 5), there is shown yet still another embodiment of the present invention. In this sixth embodiment, the first sealing cavity 36 is as described in the first embodiment of the present invention, that is, a stepped relationship between the interior surface 62 of the female member 14 and the exterior surface 96 of the male member 12 to define the first sealing cavity 36 for receipt of the first O-ring 40 therein. In addition, in this particular embodiment, the second sealing cavity 38 is formed in a similar manner, e.g., the exterior surface 96 of the male member 12 includes a second annular shoulder 140 which terminates in a front or leading wall 142. A cylindrical shaft portion 144 having a smaller generally uniform outside diameter less than the second annular shoulder 140 extends axially and distally from the front or leading wall 142. The interior surface 62 of the female member 14 includes a female annular sealing ridge 146 which extends radially into the receiving passageway 16 a sufficient distance to slidably abut the corresponding portion of the male exterior surface 96. In this particular embodiment, the female sealing ridge 146 includes a trailing edge or wall 148. The trailing wall 148 may be non-parallel with the central longitudinal axis of the female member, for example, substantially orthogonal thereto, and is axially spaced apart from about 0.095 inches to about 0.105 inches, from the leading wall 142 of the male member second annular shoulder 140 to define second sealing cavity 38 for receipt of the second O-ring 42.

Figure 9:
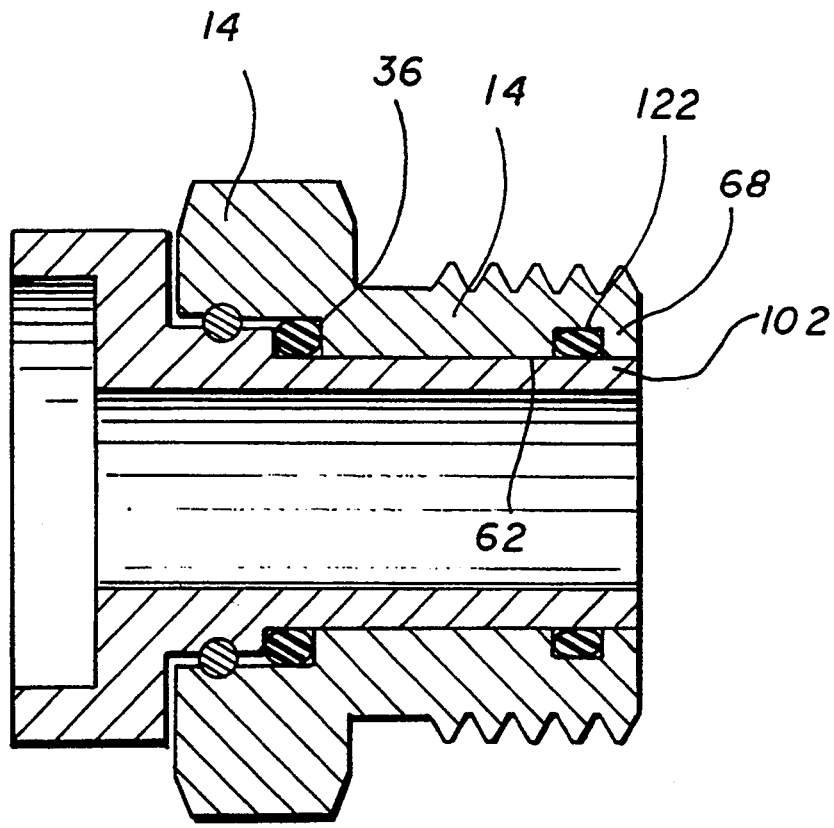
FIG. 9 is a sectional side elevational view of yet still another embodiment of the present invention.

Referring now to FIG. 9 (case 6), another embodiment of the present invention is illustrated. In this embodiment, the first sealing cavity 36 is of the stepped-type as more fully described with regard to FIG. 7. The second sealing groove is defined as a circumferential groove 122 defined within the inside surface 62 of the female member as more fully described in reference to FIG. 4. In this particular embodiment, however, female transition portion 80, first annular portion 76 and cutting edge 72 are absent. In addition, male leading edge 102 terminates parallel with the second end 68 of the female member 14.

Figure 10:
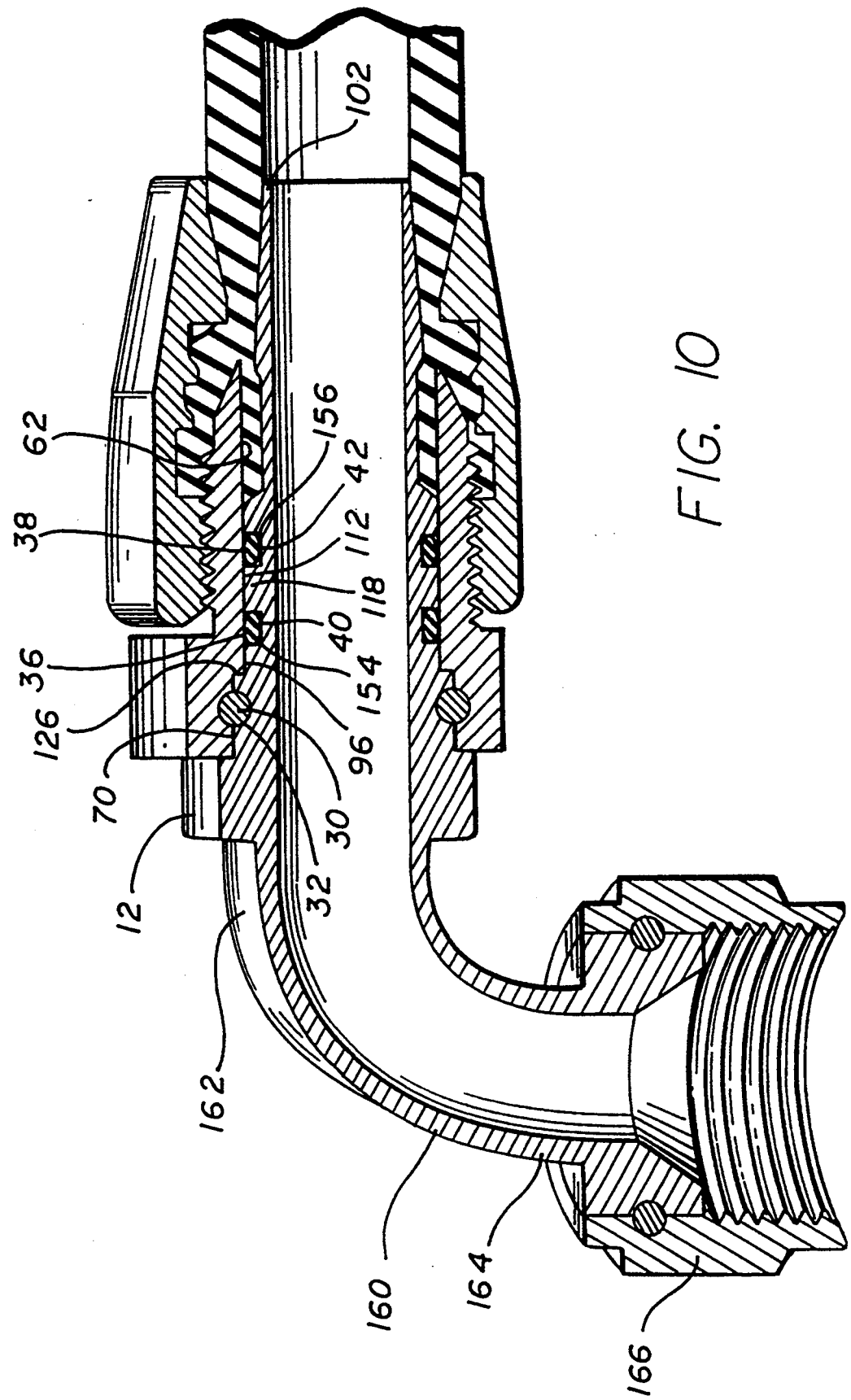
FIG. 10 is a sectional side elevational view of a still further embodiment of the present invention.

Referring now to FIG. 10, there is shown still a further embodiment of the present invention. In this particular embodiment, the locking groove 32, defined within the respective portions of the male member exterior surface 96 and the female interior surface 62, for receipt of the locking wire 30, is positioned at a more central location within the hex body 70 since the first annular sealing cavity 36, is positioned or distally defined towards the second end of the male member 68, i.e., into the surface of the second portion 118 of the annular shoulder 112. As a result, both the first and second sealing cavities 36 and 38, respectively, for receipt of the O-rings 40 and 42, respectively, are defined, in part, by annular grooves 154 and 156, respectively, cut within the exterior surface 96 of the second portion 118 of the male member shoulder 112. In this particular embodiment, the first sealing cavity 36 and the second sealing cavity 38 are spaced apart form one another a sufficient distance to maintain an improved fluid seal. For example, the first sealing cavity 36 may be defined about 1.205 inches to about 1.220 inches from the leading edge 102 of the male member 12, while the second sealing cavity may be formed about 1.450 inches to about 1.465 inches from the same. The second portion 118 of the annular shoulder 112 extends a sufficient longitudinal distance within the required tolerances of the female interior surface 62 to stabilize or substantially reduce the pivoting of the male member 12 relative to the female member 14. In this embodiment, the second portion 118 extends axially between about 0.480 inches to about 0.500 inches from lead wall 126 and the female interior surface 62. Moving the first sealing cavity 36 and O-ring 40 from the hex body 70 allows the lock wire 30 to be placed in a more central portion of the hex body, increasing the area around the lock wire, increasing its strength, while still keeping the overall length of the improved fitting short.

Male member 12 may be mounted to a fluid conduit 160 by any conventional means known to those of ordinary skill in the art of fluid conduit fittings, e.g., brazing, to a preformed section of metal tubing or hose. Fluid conduit 160 may have a first end 162 mounted to a male member 12 and a second end 164 terminating in a swivel nut 166 of conventional construction.

It will be appreciated from the foregoing that the present invention represents a significant advance in the field of fluid conduit couplings. In particular, the present invention provides a means to provide for an alternative method of achieving and maintaining proper assembled orientation of the mating male and female members while providing rotational capability and extra sealing protection for these type of hose tubes or pipe fittings. It will be appreciated that, although the presently preferred embodiments of the present invention have been described by way of example, various modifications may be made without departing from the spirit and scope of the invention. Accordingly, the present invention is not limited except as by the appended claims.

What is claimed is:

1. A swivel fitting for use in combination with a fluid conduit, said swivel fitting comprising:

a female member having a first female end, a second female end, means for engaging a fluid conduit and an interior extended neck portion intermediate said first and second female ends;

a hose coupling member to cooperate with said female member to engage said fluid conduit;

a male member for receipt within said female receiving bore, said male member having a first male end, a second male end, a central longitudinal axis and an exterior surface defining an extended annular shoulder portion dimensioned to slidably abut said female member interior extended neck portion for slidably engaging said male member with said female member;

locking means for maintaining said male member within said female member and preventing relative axial movement between said male and female members, said locking means including a locking wire, said male and female members together defining an annular locking groove for receipt of said locking wire;

sealing means for maintaining a fluid seal between said female member and said male member, said sealing means including an elastomeric O-ring, said male and female members together defining a first sealing cavity for compressed receipt of said O-ring therein; and said male member including an annular connector portion at said first male end, a male annular locking ridge adjacent to said annular connector portion extending radially outward from said male member exterior surface, and said female member including a female annular portion extending radially inward into said receiving bore to slidably engage with said male member exterior surface, said male annular locking ridge and said female annular portion axially spaced apart from each other to define said sealing cavity axially therebetween.

2. A swivel fitting for use in combination with a fluid conduit, said swivel fitting comprising:

a female member having a first female end, a second female end, means for engaging a fluid conduit and an interior surface defining a sealing bore therethrough having an interior extended neck portion intermediate said first and second female ends;

a hose coupling member to cooperate with said female member to engage said fluid conduit;

a male member for receipt within said female receiving bore, said male member having a first male end, a second male end, a central longitudinal axis and an exterior surface defining an extended annular shoulder portion dimensioned to slidably abut said female member interior extended neck portion for slidably engaging said male member with said female member;

locking means for maintaining said male member within said female member and preventing relative axial movement between said male and female members, said locking means including a locking wire, said male and female members together defining an annular locking groove for receipt of said locking wire;

sealing means for maintaining a fluid seal between said female member and said male member, said sealing means including an elastomeric O-ring, said male and female members together defining a first sealing cavity for compressed receipt of said O-ring therein; and said male member having an annular groove defined within said male member exterior surface, said annular groove and said female interior surface defining said first sealing cavity, wherein said female interior surface defines a second annular groove therein, said second annular groove and said male exterior surface defining a second sealing cavity therein, and further including a second elastomeric O-ring for compressive receipt within said second sealing groove.

3. A swivel fitting for use in combination with a fluid conduit as set forth in claim 1, said female member defining a portion of a second annular sealing groove said male annular shoulder portion and said female portion of said second annular sealing groove cooperating to form said second annular sealing groove for receipt of said second elastomeric O-ring.

4. A swivel fitting for use in combination with a fluid conduit, said swivel fitting comprising:

a female member having a first female end, a second female end, means for engaging a fluid conduit and an interior surface defining a sealing bore therethrough having an interior extended neck portion intermediate said first and second female ends;

a hose coupling member to cooperate with said female member to engage said fluid conduit;

a male member for receipt within said female receiving bore, said male member having a first male end, a second male end, a central longitudinal axis and an exterior surface defining an extended annular shoulder portion dimensioned to slidably abut said female member interior extended neck portion for slidably engaging said male member with said female member;

locking means for maintaining said male member within said female member and preventing relative axial movement between said male and female members, said locking means including a locking wire, said male and female members together defining an annular locking groove for receipt of said locking wire;

sealing means for maintaining a fluid seal between said female member and said male member, said sealing means including an elastomeric O-ring, said male and female members together defining a first sealing cavity for compressed receipt of said O-ring therein;

said male exterior surface including a first portion non-parallel with said male member central longitudinal axis, and said female interior surface including a portion non-parallel with said female member longitudinal axis, said non-parallel surfaces spaced axially apart from one another to define, in part, said first sealing cavity; and said female interior surface defining a second annular groove therein, said second annular groove and said substantially uniform first diameter male exterior surface defining a second sealing cavity therein, and further including a second elastomeric O-ring, said second elastomeric O-ring for compressed receipt within said second sealing cavity.

5. A swivel fitting for use in combination with a fluid conduit, said swivel fitting comprising:
 a female member having a first female end, a second female end, means for engaging a fluid conduit and an interior surface defining a sealing bore therethrough having an interior extended neck portion intermediate said first and second female ends;
 a hose coupling member to cooperate with said female member to engage said fluid conduit;
 a male member for receipt within said female receiving bore, said male member having a first male end, a second male end, a central longitudinal axis and an exterior surface defining an extended annular shoulder portion dimensioned to slidably abut said female member interior extended neck portion for slidably engaging said male member with said female member;
 locking means for maintaining said male member within said female member and preventing relative axial movement between said male and female members, said locking means including a locking wire, said male and female member together defining an annular locking groove for receipt of said locking wire;
 sealing means for maintaining a fluid seal between said female member and said male member, said sealing means including an elastomeric O-ring, said male and female members together defining a first sealing cavity for compressed receipt of said O-ring therein;
 said male exterior surface including a first portion non-parallel with said male member central longitudinal axis, and said female interior surface including a portion non-parallel with said female member longitudinal axis, said non-parallel surfaces spaced axially apart from one another to define, in part, said first sealing cavity; and
 said male exterior surface defining a second annular groove therein, said female interior surface having said annular groove, a substantially uniformly diametered interior surface of said female member defining a second sealing groove therein, and further including a second elastomeric O-ring for compressive receipt within said second sealing groove.

6. A swivel fitting for use in combination with a fluid conduit, said swivel fitting comprising:
 a female member having a first female end, a second female end, means for engaging a fluid conduit and an interior surface defining a sealing bore therethrough having an interior extended neck portion intermediate said first and second female ends;
 a hose coupling member to cooperate with said female member to engage said fluid conduit;
 a male member for receipt within said female receiving bore, said male member having a first male end, a second male end, a central longitudinal axis and an exterior surface defining an extended annular shoulder portion dimensioned to slidably abut said female member interior extended neck portion for slidably engaging said male member with said female member;
 locking means for maintaining said male member within said female member and preventing relative axial movement between said male and female members, said locking means including a locking wire, said male and female members together defining an annular locking groove for receipt of said locking wire;
 sealing means for maintaining a fluid seal between said female member and said male member, said sealing means including an elastomeric O-ring, said male and female members together defining a first sealing cavity for compressed receipt of said O-ring therein; and
 said female interior surface defining a first annular groove adjacent said first female member end and a second annular groove adjacent said second female member end, said first and second annular grooves and said male exterior surface further defining said first sealing cavity and defining a second sealing cavity, and further including a second elastomeric O-ring for compressive receipt within said second sealing cavity.

7. A swivel fitting for use in combination with a fluid conduit, said swivel fitting comprising:
 a female member having a first female end, a second female end, means for engaging a fluid conduit and an interior surface defining a sealing bore therethrough having an interior extended neck portion intermediate said first and second female ends;
 a hose coupling member to cooperate with said female member to engage said fluid conduit;
 a male member for receipt within said female receiving bore, said male member having a first male end, a second male end, a central longitudinal axis and an exterior surface defining an extended annular shoulder portion dimensioned to slidably abut said female member interior extended neck portion for slidably engaging said male member with said female member;
 locking means for maintaining said male member within said female member and preventing relative axial movement between said male and female members, said locking means including a locking wire, said male and female members together defining an annular locking groove for receipt of said locking wire; and
 sealing means for maintaining a fluid seal between said female member and said male member, said sealing means including an elastomeric O-ring, said male and female members together defining a first sealing cavity for compressed receipt of said O-ring therein;
 said male exterior surface including a first portion non-parallel with said male member central longitudinal axis, and said female interior surface including a portion non-parallel with said female member longitudinal axis, said non-parallel surfaces spaced axially apart from one another to define, in part, said first sealing cavity; and
 said male exterior surface further including an exterior portion, non-parallel with said male longitudinal axis, said female interior surface further including an interior portion non-parallel with said female longitudinal axis, said second male and female non-parallel portions defining a second sealing cavity, and, further including a second O-ring for compressive receipt within said second sealing cavity.

8. A swivel fitting for use in combination with a fluid conduit, said swivel fitting comprising:
 a hose coupling member for engaging a fluid conduit, said coupling having a first hose coupling end, a second hose coupling end, a hose coupling inside surface, and a hose coupling threaded portion, said hose coupling threaded portion formed within said hose coupling inside surface adjacent said hose coupling second end;

a female member having a substantially cylindrical female side wall having a longitudinal receiving bore therethrough, a female interior surface, an exterior surface, a first female end and a second female end, said female interior surface having a plurality of annular necks extending into said longitudinal bore, said annular necks defining, in part, an annular locking groove an a first annular sealing groove therein;

a male member having a male interior surface, a male exterior surface, a first male end, a second male end, and a substantially cylindrical male side wall, said side wall including an annular shoulder extending radially outward to slidably abut an interior one of said female member annular necks on said female interior surface, an annular locking ridge formed adjacent said male member end, portions of said locking wire groove defined within said annular shoulder adjacent said second male end and a first sealing groove defined therein;

a locking wire positioned within said first annular groove preventing relative axial movement between said male and female members; and a first elastomeric O-ring positioned within said first sealing groove.

9. A swivel fitting for use in combination with a fluid conduit, said swivel fitting comprising:

a hose coupling member, said coupling member having a first coupling end, a second coupling end, a coupling inside surface and a threaded portion, said threaded portion formed within said inside coupling surface adjacent said second coupling end;

a female member having a female interior surface, a female exterior surface, a first female end a second female end, said female interior surface defining a receiving bore therethrough having an interior extended neck portion intermediate said first and second female ends;

a male member having a first male end, a second male end, a male interior surface and a male exterior surface, and a cylindrical shaft portion with a shoulder portion having a first outer diameter and a second shoulder portion having a second outer diameter dimensioned to slidably abut said female member interior extended neck portion, said first shoulder portion having a locking wire groove defined therein, said male and female members together defining first and second sealing cavities;

a locking wire positioned within said locking wire groove preventing relative axial movement between said male and female members; and first and second elastomeric O-rings for compressive receipt within said first and second sealing cavities.

10. A swivel fitting for use in combination with a fluid conduit as set forth in claim 9, wherein said second male shoulder portion has a second annular groove defined therein for receipt of said second O-ring.

* * * * *

UNITED STATES PATENT AND TRADEMARK OFFICE
CERTIFICATE OF CORRECTION

PATENT NO. : 5,340,168
DATED : August 23, 1994
INVENTOR(S) : David A. Barker It is certified that error appears in the above-identified patent and that said Letters Patent is hereby corrected as shown below:

In Column 4, line 24, delete "men, her", insert --member--;

In Column 6, line 5, delete "About 1.058 to 1.059 inches.";

In Column 13, line 24, delete "member", insert --members--.

Signed and Sealed this

Tenth Day of January, 1995

*Attest:*

BRUCE LEHMAN

*Attesting Officer*          *Commissioner of Patents and Trademarks*